United States Patent [19]

Andrews

[11] 4,088,557

[45] May 9, 1978

[54] ELECTRODE ASSEMBLY AND MACHINE FOR SMALL-HOLE ELECTROCHEMICAL DRILLING

[75] Inventor: Laurance Richardson Andrews, Agawam, Mass.

[73] Assignee: United Technologies Corporation, Hartford, Conn.

[21] Appl. No.: 812,205

[22] Filed: Jul. 1, 1977

[51] Int. Cl.² .................. B23P 1/04; C25D 21/06; C25B 11/03

[52] U.S. Cl. .................. 204/224 M; 204/238; 204/276; 204/284

[58] Field of Search .................. 204/224 M, 276, 284, 204/238

[56] References Cited

U.S. PATENT DOCUMENTS

| | | | |
|---|---|---|---|
| 593,837 | 11/1897 | Dunton | 204/276 X |
| 3,409,534 | 11/1968 | Andrews et al. | 204/224 M |
| 3,803,015 | 4/1974 | Andrews | 204/224 M |
| 4,040,933 | 8/1977 | Andrews | 204/224 M |

FOREIGN PATENT DOCUMENTS 2,358,684   9/1974   Germany .................. 204/224 M

*Primary Examiner*—John H. Mack
*Assistant Examiner*—D. R. Valentine
*Attorney, Agent, or Firm*—Edward J. Timmer

[57] ABSTRACT

The present invention discloses an improved electrode assembly and electrochemical drilling machine for drilling small diameter holes. The electrode assembly includes a metallic working electrode tube having an inlet end for electrolyte entry and an outlet end for drilling, the tube having preselected dimensions to provide the desired diameter and depth of hole. The assembly also includes a filter tube one end portion of which defines a plurality of individual access openings for electrolyte entry from an electrolyte source, each opening having a smaller cross section than the bore of the working electrode tube to filter out particles in the electrolyte which could clog the electrode tube and the other end of which is in fluid communication with the inlet end of the electrode tube for delivering filtered electrolyte thereto. Connector means are provided for releasably and sealably connecting the electrode tube and filter tube, enabling the electrode tube to be removed, if damaged or otherwise defective, without disconnecting the filter tube from the electrolyte source.

15 Claims, 4 Drawing Figures

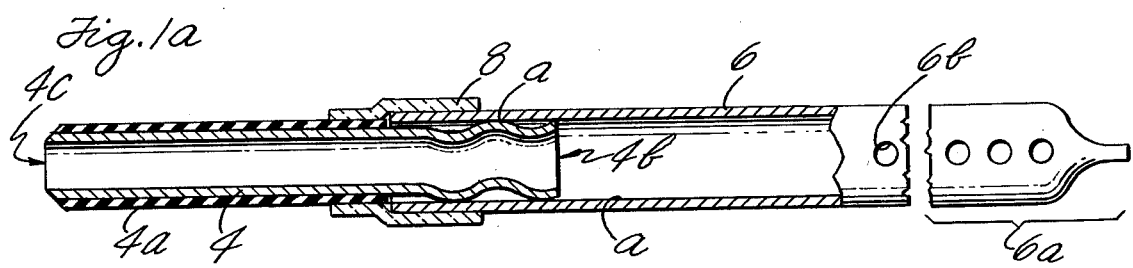
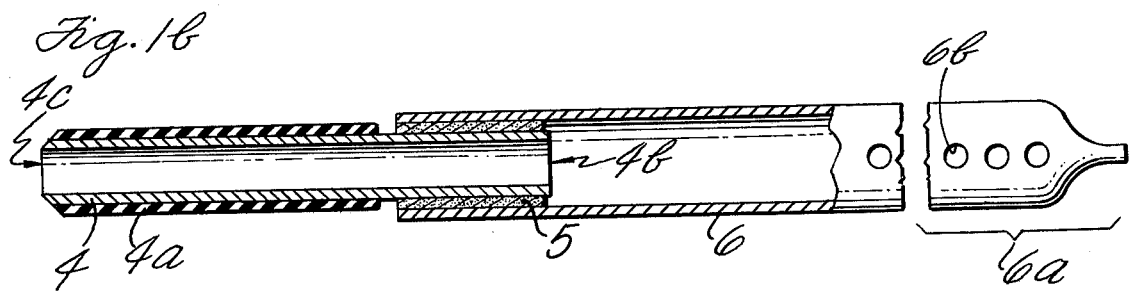
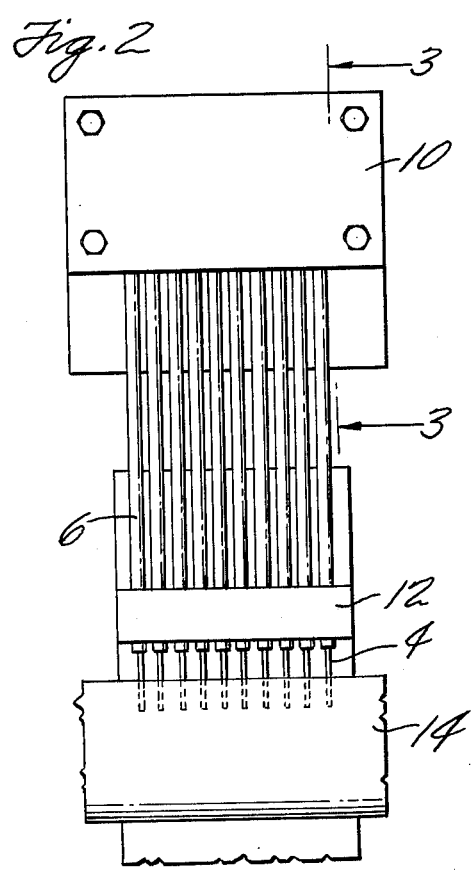
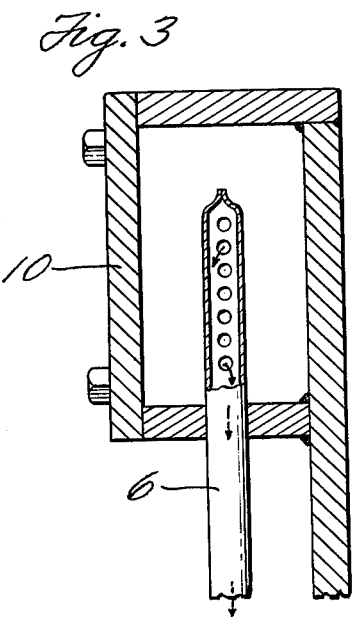

ELECTRODE ASSEMBLY AND MACHINE FOR SMALL-HOLE ELECTROCHEMICAL DRILLING

BACKGROUND OF THE INVENTION

1. Field of the Invention

The present invention relates to electrochemical drilling and, more particularly, to an improved electrode assembly and machine for use in drilling small diameter holes.

2. Description of the Prior Art

Electrochemical drilling is a widely used technique for providing holes and the like in difficult to machine metal and alloy articles, such as nickel or cobalt base superalloy turbine blades or vanes. U.S. Pat. No. 3,647,674 discusses several factors which limit the minimum diameter of holes which can be drilled with such processes.

One limiting factor which has been especially troublesome is the propensity for blockage of the hollow electrode tube by dirt particles or other matter in the electrolyte being pumped therethrough. Of course, if electrolyte flow through the tube is blocked, drilling cannot proceed and the tube must be removed and cleaned before drilling can resume. In some cases, this necessitates dismantling major parts of the electrochemical machine, such as, for example, the electrolyte manifold which distributes electrolyte to the individual electrode tubes.

As the diameter of the hole to be drilled decreases, the internal diameter of the hollow electrode tube in general must also decrease. As a result, clogging and blocking of the tube is considerably more frequent in drilling smaller diameter holes than larger ones and this increased clogging has somewhat limited the use of electrochemical drilling in the commercial production of large numbers of parts having a plurality of small diameter holes therein. The problem is aggravated when the holes are not only small in diameter but also of considerable depth.

Another problem associated with small hole drilling is that the thin walled, small diameter electrode tubes are prone to bend and flex during drilling and thereby deviate from the desired drilling path. This bending produces misaligned holes and is aggravated as the depth of the hole increases.

SUMMARY OF THE INVENTION

Accordingly, it is an object of the present invention to provide an improved electrode assembly and drilling machine especially useful for drilling small diameter holes, such as holes of a diameter of about 10 mils to 20 mils and above.

It is another object of the invention to significantly reduce, if not eliminate, clogging or blocking of the electrode tube during drilling of small diameter holes.

It is another object of the invention to allow a damaged or otherwise defective electrode tube to be removed without dismantling major components of the drilling machine.

It is still another object of the invention to minimize bending and flexing of the electrode tube during drilling, thereby reducing the number of misaligned holes and number of workpieces rejected therefor.

In a typical preferred embodiment of the present invention, the electrode assembly includes a metallic working electrode tube having an inlet end for receiving electrolyte and an outlet end for directing the electrolyte against the workpiece for drilling, the dimensions of the tube being selected to produce the desired diameter and depth of hole. The assembly also includes a filter tube, one end portion of which defines a plurality of individual access openings for electrolyte entry from an electrolyte source, the cross-section of the access openings being smaller than the bore of the working electrode tube to prevent particles capable of clogging the electrode tube from entering the assembly, and the other end of which is in fluid communication with the inlet end of the electrode tube for delivering filtered electrolyte thereto. Preferably, connector means, such as a plastic-jacket, are provided for releasably and sealably connecting the inlet end of the electrode tube with the electrolyte delivery end of the filter tube. Such connector means enables the working electrode tube to be removed, if defective, without disconnecting the filter tube from the electrolyte source.

These and other objects and advantages of the present invention will appear more fully from the following drawings and description of the preferred embodiment.

BRIEF DESCRIPTION OF THE DRAWINGS

FIGS. 1a and 1b are sectional views along the length of the electrode assembly.

FIG. 2 is a front elevation of a drilling machine incorporating the electrode assembly.

FIG. 3 is a view along line 3—3 of FIG. 2 showing the filtering end portion of the electrode assembly in the manifold.

DESCRIPTION OF THE PREFERRED EMBODIMENT

Referring to FIG. 1a, a preferred electrode assembly of the invention is shown as including a metallic working electrode tube 4, a metallic filter tube 6 and connector means in the form of plastic jacket 8 for releasably and sealably joining the tubes. As is usual in the prior art practice, the electrode tube has an electrical insulating layer 4a thereon. By way of example only, the electrode assembly will be described as one for use in drilling a hole 13.5 mils in diameter.

In drilling such a hole, the electrode tube 4 has an inner and outer diameter of 6.5 mils and 12 mils, respectively, the outer diameter including the thickness of insulation layer 4a. The tube includes inlet end 4b for receiving filtered electrolyte from the filter tube and outlet end 4c for directing the electrolyte against a workpiece (not shown) for drilling. For optimum drilling, the outer tip of the electrode tube has a frustoconical surface contour, as shown in FIG. 1a. In drilling nickel base superalloy parts, such as gas turbine blades and vanes, the electrode tube is made of titanium tubing to resist the corrosive effects of the electrolyte utilized, for example, 8% nitric acid. Of course, the inner and outer diameter of the tube are selected to produce the desired diameter hole in the workpiece. Contrary to the prior art, the length of the electrode tube is small as compared to the total length of the electrode assembly. The electrode tube length required is dictated solely by the actual depth of hole to be produced, not by the dimensions of the drilling machine. For example, in the prior art, the electrode tube 4 would be of such a length to extend from the workpiece 14 to the electrolyte manifold 10, see FIG. 2. In contrast, in the present invention, the electrode tube is of a length just sufficient to form the desired depth of hole, as discussed hereinafter. The net result is that a much shorter electrode tube is used, thereby reducing bending and flexing of the tube during drilling and the cost of the electrode assembly.

According to the present invention, filter tube 6 is connected to electrode tube 4, as shown, to deliver filtered electrolyte thereto. The filter tube is preferably a metallic tube, for example, titanium to allow completion of the electrochemical circuit through the electrode assembly and includes an end portion 6a defining a plurality of individual access openings 6b for receiving electrolyte from an electrolyte source, such as manifold 10 in FIGS. 2 and 3. As illustrated, the end portion 6a of the filter tube includes the actual end of the tube, which end may be fully closed (as shown) or partially closed, and also the tube walls adjacent thereto. In FIG. 1a, the end of the tube is fully closed for convenience and ease of fabrication. Although it may be possible to only partially close the tube end to provide an additional access opening, this would require an additional somewhat costly step as compared to simply crimping and welding the end shut and laser drilling the access openings in the tube walls. In order to effect the desired filtering action, the cross-section of each access opening in end portion 6a must be smaller than the bore (inner diameter) of the working electrode tube, for example, access openings 4.5 mils in diameter have been satisfactorily used with the electrode tube of 6.5 mils inner diameter. The number of access openings can be varied as desired to ensure adequate electrolyte flow rate and filtering action. However, it too few access openings are provided, there is a danger that the openings themselves will become clogged in a short time and block electrolyte flow into the assembly.

In certain situations, it may be desirable and preferred to increase the wall thickness of the filter tube to provide sufficient rigidity to further reduce or minimize flexing and bending of the electrode tube during drilling. This results in even fewer misaligned holes and a decrease in the number of drilled parts rejected. For example, a filter tube having inner and outer diameters of 13 mils and 25 mils, respectively, has been found suitable to further minimize flexing of the electrode tube of dimensions given hereinabove.

As shown in FIG. 1a, the inlet end of the working electrode tube is inserted in the open end of the filter tube to provide fluid communication therebetween, the portion of the electrode tube inserted into the filter tube preferably being provided with bends or kinks to insure electrical contact is made between the outer wall of the electrode tube and inner wall of the filter tube. Thus, the filtered electrolyte can pass through the filter tube into the electrode tube for direction against the workpiece. To prevent leakage at the area of insertion and to allow the electrode tube to be removed, if damaged or otherwise defective, without dismantling the manifold 10, the tubes are preferably joined together by plastic jacket 8 which is heat-shrunk or otherwise formed therearound. A heat-shrinkable polyolefin jacket has been satisfactorily used. Of course, those skilled in the art will recognize that other releasable connector means may be used. Those skilled in the art will also recognize that the electrode tube and filter tube may also be permanently and sealably connected together, such as by brazing material 5 as in FIG. 1b, conductive epoxy binder and the like. Or, the tube ends may be flared, swaged and the like to effect such a permanent and sealed connection.

In FIG. 2, a plurality of electrode assemblies are shown positioned in a conventional electrochemical drilling machine which machine includes an electrolyte manifold 10 mounted on a movable ram (not shown) and a guide member 12 for positioning the electrode assemblies in precise relation to the workpiece 14. As illustrated, the working electrode tubes 4 are positioned against the workpiece for commencement of drilling. It should be noted that the length of the electrode tubes is just sufficient to produce the desired depth of hole (dotted line) as the ram moves the tubes downwardly toward and into the workpiece. The filter tubes 6 extend from the electrode tubes through the guide member and into the manifold. In the manifold, electrolyte enters the access openings provided in the end portion of the filter tube, as shown in FIG. 3.

It will now be apparent that the present invention provides several advantages over prior art electrodes and drilling machines. An especially important advantage of the invention is that the electrolyte is filtered before it enters the electrode assembly. Filtering insures that drilling will not have to be prematurely terminated or interrupted to change a clogged electrode tube. If one or more electrode tubes should be damaged or otherwise become inoperative, the malfunctioning tubes can be removed and replaced simply and easily without dismantling the manifold, guide member of other machine components. The use of the short electrode tubes and/or the relatively thick walled filter tubes minimizes flexing and bending of the electrode tubes and greatly reduces the number of misaligned holes and rejected parts.

Although the invention has been shown and described with respect to illustrative embodiments thereof, it will be understood by those skilled in the art that changes and additions in the form and detail thereof may be made without departing from the spirit and scope of the invention.

Having thus described a typical embodiment of my invention, that which I claim as new and desire to secure by Letters Patent of the United States is:

1. An electrode assembly for use in electrochemical drilling, comprising:
    (a) a metallic working electrode tube having an inlet end for receiving electrolyte and an outlet end for directing the electrolyte against the workpiece for drilling, the tube having preselected dimensions to produce the desired diameter and depth of hole in the workpiece;
    (b) a filter tube, one end portion of which defines a plurality of individual access openings for entry of electrolyte from an electrolyte source, each access opening having a cross-section smaller than the bore of the electrode tube to prevent particles in the electrolyte capable of clogging the electrode tube from entering the assembly, and the other end of which is in sealed fluid communication with the inlet end of the electrode tube for delivering filtered electrolyte thereto.

2. The electrode assembly of claim 1 wherein the end portion of the filter tube defining the access openings includes the actual end of the tube, said end being at least partially closed, and tube walls adjacent said end.

3. The electrode assembly of claim 1 wherein the inlet end of the electrode tube is inserted into the open end of the filter tube and bonded thereto to establish sealed fluid communication therebetween.

4. The electrode assembly of claim 1 wherein the filter tube is a metallic tube to complete the electrochemical circuit through the electrode assembly.

5. An electrode assembly for use in electrochemical drilling, comprising:
   (a) a metallic working electrode tube having an inlet end for receiving electrolyte and an outlet end for directing the electrolyte against the workpiece for drilling, the tube having preselected dimensions to produce the desired diameter and depth of hole in the workpiece;
   (b) a filter tube, one end portion of which defines a plurality of individual access openings for entry of electrolyte from an electrolyte source, each access opening having a cross-section smaller than the bore of the electrode tube to prevent particles in the electrolyte capable of clogging the electrode tube from entering the assembly, and the other end of which is open and in fluid communication with the inlet end of the electrode tube for delivering filtered electrolyte thereto; and
   (c) connector means for releasably and sealably connecting the open end of the filter tube to the inlet end of the electrode tube, said means enabling the electrode tube to be removed without disconnecting the filter tube from the electrolyte source.

6. The electrode assembly of claim 5 wherein the end portion of the filter tube defining the access openings includes the actual end of the tube, said end being at least partially closed, and tube walls adjacent said end.

7. The electrode assembly of claim 5 wherein the inlet end of the electrode tube is inserted into the open end of the filter tube to establish fluid communication therebetween.

8. The electrode assembly of claim 5 wherein the connector means includes a plastic jacket sealed around the junction of the filter tube and electrode tube.

9. The electrode assembly of claim 5 wherein the filter tube is a metallic tube to complete the electrochemical circuit through the electrode assembly.

10. The electrode assembly of claim 5 wherein the length of the working electrode tube is just sufficient to produce the desired depth of hole.

11. In an electrochemical drilling machine wherein a plurality of individual electrodes are used to drill holes in a workpiece, one end of the electrodes being in communication with an electrolyte manifold and the other being positioned by guide means adjacent the workpiece, the improvement which comprises individual self-filtering electrode assemblies, each assembly including:
   (a) a metallic working electrode tube having an inlet end below the guide member for receiving electrolyte and an outlet end adjacent the workpiece for directing electrolyte thereagainst for drilling, the inner and outer diameter of said tube being selected to provide the desired diameter hole in the workpiece and the length of said tube being just sufficient to provide the desired depth of hole;
   (b) a filter tube, one end portion of which is positioned in the electrolyte manifold, said end portion defining a plurality of individual access openings for receiving electrolyte from the manifold, each access opening having a cross-section smaller than the bore of the electrode tube to prevent particles in the electrolyte capable of clogging the electrode tube from entering the assembly, and the other end portion of which is open and positioned by the guide member in fluid communication with the inlet end of the electrode tube for delivering filtered electrolyte thereto; and
   (c) connector means for releasably and sealably connecting the open end of the filter tube with the inlet end of the electrode tube, said means enabling the electrode tube to be removed without disconnecting the filter tube from the manifold.

12. The electrode assembly of claim 11 wherein the end portion of the filter tube defining the access openings includes the actual end of the tube, said end being at least partially closed, and tube walls adjacent said end.

13. The electrode assembly of claim 11 wherein the inlet end of the electrode tube is inserted into the open end of the filter tube to establish fluid communication therebetween.

14. The electrode assembly of claim 11 wherein the connector means includes a plastic jacket sealed around the junction of the filter tube and electrode tube.

15. The electrode assembly of claim 11 wherein the filter tube is a metallic tube to complete the electrochemical circuit through the electrode assembly.

* * * * *